(12) United States Patent
De Carvalho et al.

(10) Patent No.: US 12,534,122 B2
(45) Date of Patent: Jan. 27, 2026

(54) FRONT STRUCTURE OF A MOTOR VEHICLE

(71) Applicants: RENAULT S.A.S, Boulogne-Billancourt (FR); NISSAN MOTOR CO., LTD., Yokohama (JP)

(72) Inventors: Sergio De Carvalho, Guyancourt (FR); Christian Delord, Villiers-Saint-Frederic (FR); Fabrice Derrien, Guyancourt (FR); Frédéric Gouzy, Villiers-Saint-Frederic (FR); Kevin Lechat, Guyancourt (FR)

(73) Assignees: RENAULT S.A.S, Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 456 days.

(21) Appl. No.: 18/251,674

(22) PCT Filed: Oct. 15, 2021

(86) PCT No.: PCT/EP2021/078698
§ 371 (c)(1),
(2) Date: May 3, 2023

(87) PCT Pub. No.: WO2022/096253
PCT Pub. Date: May 12, 2022

(65) Prior Publication Data
US 2024/0010264 A1    Jan. 11, 2024

(30) Foreign Application Priority Data
Nov. 6, 2020   (FR) ..................... 20 11415

(51) Int. Cl.
*B62K 25/30*   (2006.01)
*B62D 1/20*    (2006.01)
(Continued)

(52) U.S. Cl.
CPC ............. *B62D 1/20* (2013.01); *B62D 25/081* (2013.01); *B62D 25/085* (2013.01); *B62D 27/023* (2013.01)

(58) Field of Classification Search
CPC ...... B62D 1/20; B62D 25/081; B62D 25/085; B62D 27/023; B62D 25/14; B62D 1/16; B62D 65/02; B62D 25/082; F16J 15/14
(Continued)

(56) References Cited

U.S. PATENT DOCUMENTS

2012/0001453 A1    1/2012    Naoi

FOREIGN PATENT DOCUMENTS

DE    3 637 162 A1    5/1987
DE    196 30 303 A1    1/1998
(Continued)

OTHER PUBLICATIONS

International Search Report issued Jan. 10, 2022 in PCT/EP2021/078698 filed on Oct. 15, 2021, citing documents 1 &15-18 therein, 2 pages.

*Primary Examiner* — Valentin Neacsu
*Assistant Examiner* — Nabin Kumar Sharma
(74) *Attorney, Agent, or Firm* — Oblon, McClelland, Maier & Neustadt, L.L.P.

(57) ABSTRACT

A front structure of a motor vehicle includes: a bulkhead extending between an engine compartment and a passenger compartment; two front side members connected to the bulkhead; a steering ball joint provided in the bulkhead and projecting into the engine compartment, the steering ball joint having a base and an oblong orifice provided in the base and defining an edge extending around the oblong orifice facing the engine compartment; and a rack installed in the engine compartment and a rack seal designed to engage between the rack and the steering ball joint. The (Continued)

structure also includes a planar annular part surface mounted on the edge and extending around the oblong orifice in order to be able to extend the reception range of the rack seal.

9 Claims, 4 Drawing Sheets

(51) Int. Cl.
  *B62D 25/08* (2006.01)
  *B62D 27/02* (2006.01)
  *B62K 3/02* (2006.01)
  *B62K 25/04* (2006.01)
(58) Field of Classification Search
  USPC .......................................................... 180/400
  See application file for complete search history.

(56) References Cited

FOREIGN PATENT DOCUMENTS

| | | | |
|---|---|---|---|
| DE | 19712847 A1 * | 10/1998 | ............... B62D 1/16 |
| EP | 0204131 A2 * | 12/1986 | ........... B62D 25/088 |
| GB | 2 252 596 A | 8/1992 | |

* cited by examiner

FRONT STRUCTURE OF A MOTOR VEHICLE

The invention relates to a front structure of a motor vehicle which has a passenger compartment and an engine compartment which are located in continuation of each other.

The known front structures of motor vehicles comprise a bulkhead which extends transversely between the engine compartment and the passenger compartment of the vehicles. They also comprise two front side members which extend parallel with each other from the bulkhead in the engine compartment and in a longitudinal direction of the vehicle. Therefore, these structures comprise a steering column and a rack which are connected together in the region of a steering ball joint which is provided in the bulkhead. The steering column extends into the passenger compartment as far as a steering wheel, whilst the rack extends as far as the front wheels in order to be able to orientate them.

The steering ball joint is provided in the bulkhead in line with the steering column and it protrudes into the engine compartment between the side members but in the vicinity of the connection between the bulkhead and one of the side members, the left side member in particular for left-hand drive motor vehicles.

The steering ball joint has a flat base in which an oblong hole is provided in order to be able to ensure the connection between the steering column and the rack. At the side of the engine compartment, the steering ball joint has an edge which extends around the oblong hole and against which the rack is pressed. There is inserted between the two a joint which, taking into account the assembly features, is adapted to be driven in translation against the edge by the rack whilst being compressed. Such an assembly requires a relatively wide edge around the oblong hole in order to ensure the implementation thereof and in order to obtain excellent sealing.

For reasons of comfort in the passenger compartment, the steering column supported by the bulkhead is adjusted laterally as far to the left as possible, in a left-hand drive vehicle, for example, in order to release space for the front passenger.

However, new requirements in terms of wheel width and/or turning radius require the front side members to be moved closer together.

Consequently, if it is desirable to preserve the above-mentioned comfort, constraints will be applied to the steering ball joint which will then become wedged in the angle between the bulkhead and the side member and the dimensions of which can no longer be maintained. This applies in particular to the width of the edge which surrounds the oblong hole.

As a result, the above-mentioned assembly of the steering column and the rack is more difficult.

Therefore, a problem which arises and which the present invention is intended to overcome is to provide a front motor vehicle structure which enables acceptance of the front side members being moved together whist enabling normal assembly of the rack and the steering column via the steering ball joint.

To this end, there is proposed a front structure of a motor vehicle which has a passenger compartment and an engine compartment which extends in continuation of the passenger compartment, the structure comprising: a front bulkhead which extends transversely between the engine compartment and the passenger compartment and which is suitable for supporting a steering column; two substantially parallel front side members which are connected to the bulkhead and which extend longitudinally in the engine compartment; a steering ball joint which is arranged in the bulkhead substantially in line with the steering column and which protrudes into the engine compartment between the two side members close to the connection between the bulkhead and one of the side members, the steering ball joint having a base and an oblong hole which is provided in the base and which defines an edge which extends around the oblong hole opposite the engine compartment and; a rack which is installed in the engine compartment and a rack joint which is capable of engaging between the rack and the steering ball joint when the steering column is connected to the rack via the oblong hole. The structure further comprises an annular planar component which is installed in a state applied to the edge and which extends around the oblong hole in order to be able to widen the receiving bearing of the rack joint.

In this manner, a feature of the invention involves the use of an annular planar component against the edge of the ball joint, opposite the base, and which can extend around the oblong hole over a sufficiently large width to enable the assembly of the rack and the steering column in accordance with the usual method. This is because, taking into account the dimensional constraints applied to the steering ball joint, the edge of the ball joint, which is opposite the base and which extends around the oblong hole, is no longer large enough to be able to precisely permit this usual assembly. As a result of the annular planar component, the receiving bearing of the rack joint is thus enlarged and this assembly is thus enabled.

According to a particularly advantageous embodiment of the invention, the two side members define a mean plane, the annular planar component is inclined relative to the mean plane. The mean plane defined by the two side members is substantially parallel with the mean horizontal plane of the motor vehicle, and the annular planar component is inclined relative to this horizontal mean plane, by a value between 40° and 50°, for example. How this inclination enables the assembly to be facilitated will be explained in greater detail below in the remainder of the description.

Therefore, one of the side members and the bulkhead define a bisector plane, the oblong hole advantageously extends along a component contained in the bisector plane. The bisector plane extends substantially vertically and it is inclined substantially by 45° relative to the longitudinal axis of the motor vehicle. Consequently, the oblong hole extends substantially diagonally in the engine compartment, which in particular enables the assembly of the rack and the steering column to be facilitated.

Furthermore, the oblong hole preferably has a lower end which is located toward one of the side members and an upper end which is opposite the lower end and which is spaced apart from one of the side members. Such an arrangement again enables the assembly to be facilitated.

Furthermore, and according to a particularly advantageous feature of the invention, the annular planar component is connected to the edge by weld points. The width of the edge of the steering ball joint enables the annular planar component to be connected at that location by means of weld points which are regularly spaced apart from each other all around the oblong hole, for example, by means of a conventional set of welding tongs having two opposing electrodes.

Preferably, the structure according to the invention comprises an annular mastic joint between the annular planar component and the edge. In this manner, the mastic is applied, for example, before the welding of the annular planar component and the edge of the steering ball joint. The mastic thus ensures the complete sealing between the annular planar component and steering ball joint.

Therefore, the annular planar component has an inner edge and an opposing outer edge, and the minimum distance between the two opposing edges is advantageously between 15 mm and 25 mm. For example, this distance is 20 mm. As will be explained below, such a width enables the rack and the steering column to be mounted in accordance with the normal method where the joint is then compressed. According to a particularly advantageous feature, the inner edge delimits a cross section which is identical to the cross section of the oblong hole. Therefore, the annular planar component is adjusted by pressing on the edge of the steering ball joint so that the inner edge thereof coincides completely with the oblong hole. The annular planar component is also welded to the steering ball joint in this position.

Preferably, the annular planar component has a peripheral edge. The peripheral edge extends opposite the steering ball joint and thus enables the edge of the joint to be contained when they are compressed during the assembly of the rack and the steering column.

Other features and advantages of the invention will be appreciated from the reading of the following description of a specific embodiment of the invention, given by way of non-limiting example, with reference to the appended drawings in which.

There will first be described with reference to [FIG. 1], [FIG. 2], [FIG. 3] and [FIG. 4] the structural environment in which the problem which the invention overcomes arises.

Figure 1:
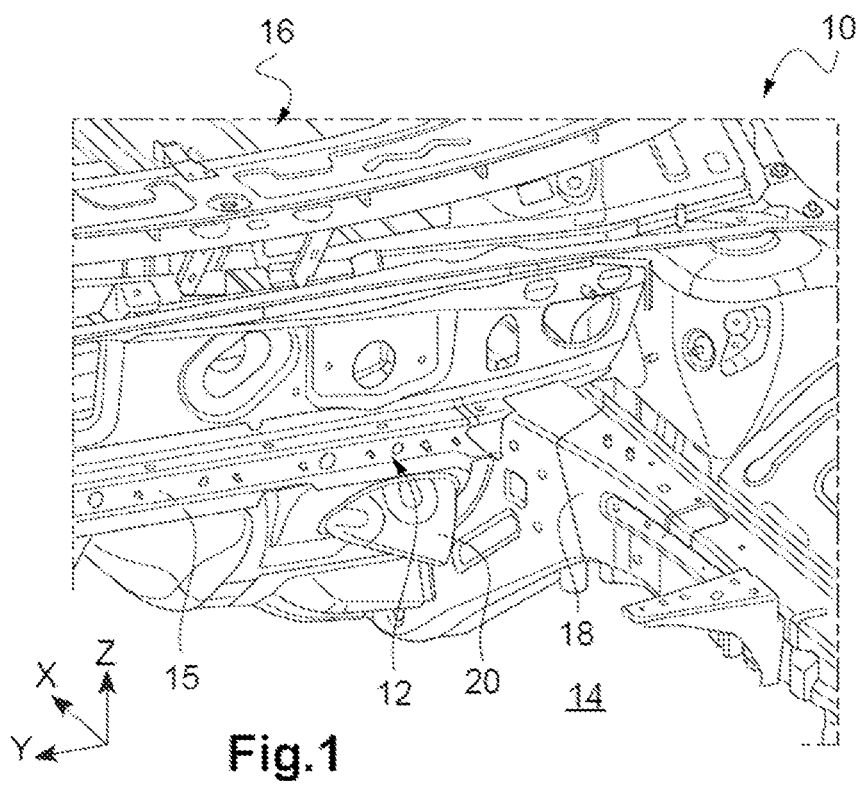
FIG. 1 shows a schematic perspective top view of a portion of a front motor vehicle structure according to one viewing angle.
Figure 2:
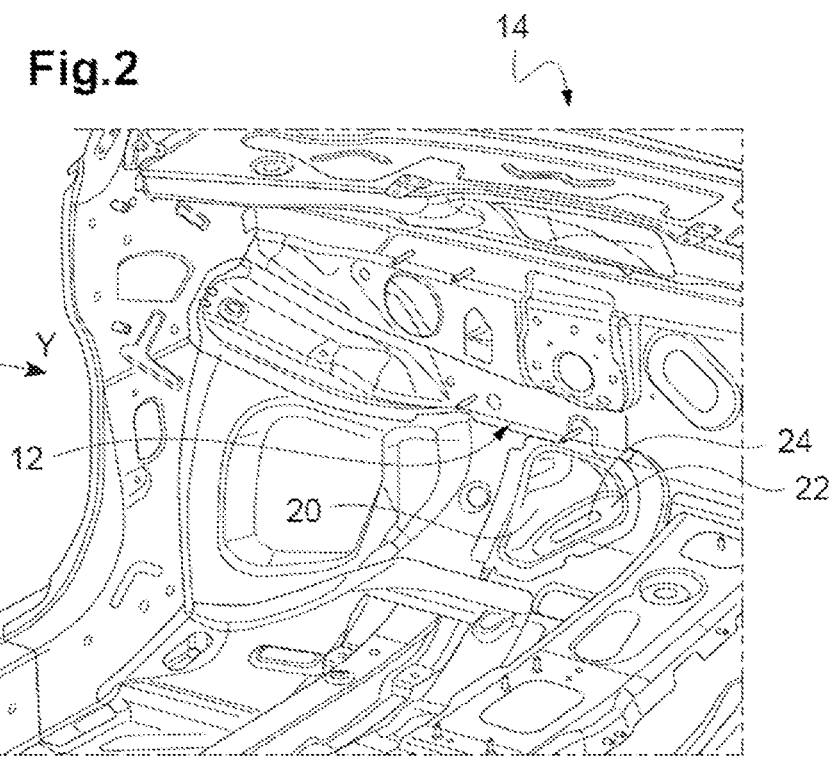
FIG. 2 shows a schematic perspective top view of another portion of the front structure illustrated in [FIG. 1]

FIG. 1 shows a front motor vehicle structure 10. The front structure 10 has a bulkhead 12 which extends transversely and which delimits an engine compartment 14, which is located in front of the bulkhead 12, from a passenger compartment 16 which is located at the rear of the bulkhead 12. The bulkhead has a bulkhead cross-member 15.

Therefore, the front motor vehicle structure 10 illustrated in [FIG. 1] is orientated in an orthogonal reference system X, Y, Z so that the axis X corresponds to the longitudinal direction of the vehicle and is orientated from the front to the rear of the vehicle, the axis Y corresponds to the transverse direction and is orientated from the left to the right of the vehicle when looking toward the front of the vehicle and the axis Z denotes the vertical direction which is orientated counter to the surface on which the vehicle rests in its normal operating state.

FIG. 1 shows a left front side member 18 which extends in the engine compartment 14 from the bulkhead cross-member 15, substantially in the direction of the axis X, as defined above. It will be seen that the bulkhead cross-member 15 itself extends substantially in the direction of the axis Y. Furthermore, a steering ball joint 20 which protrudes into the engine compartment 14 in the region of the connection between the bulkhead cross-member 15 and the left front side member 18 is also illustrated in [FIG. 1].

Reference will now be made to [FIG. 2], which shows the bulkhead 12 when viewed, no longer from the engine compartment 14, but instead from the passenger compartment 16. The steering ball joint 20 is thus in a state provided in the bulkhead 12. The steering ball joint 20 is hollow and it has a base 22 in which an oblong hole 24 is formed. The steering ball joint 20 defines a housing which is sufficiently large to be able to receive the hand of an operator, as will be explained below. The oblong hole 24 opens in the engine compartment 14 located at the rear of the bulkhead 12.

Figure 3:
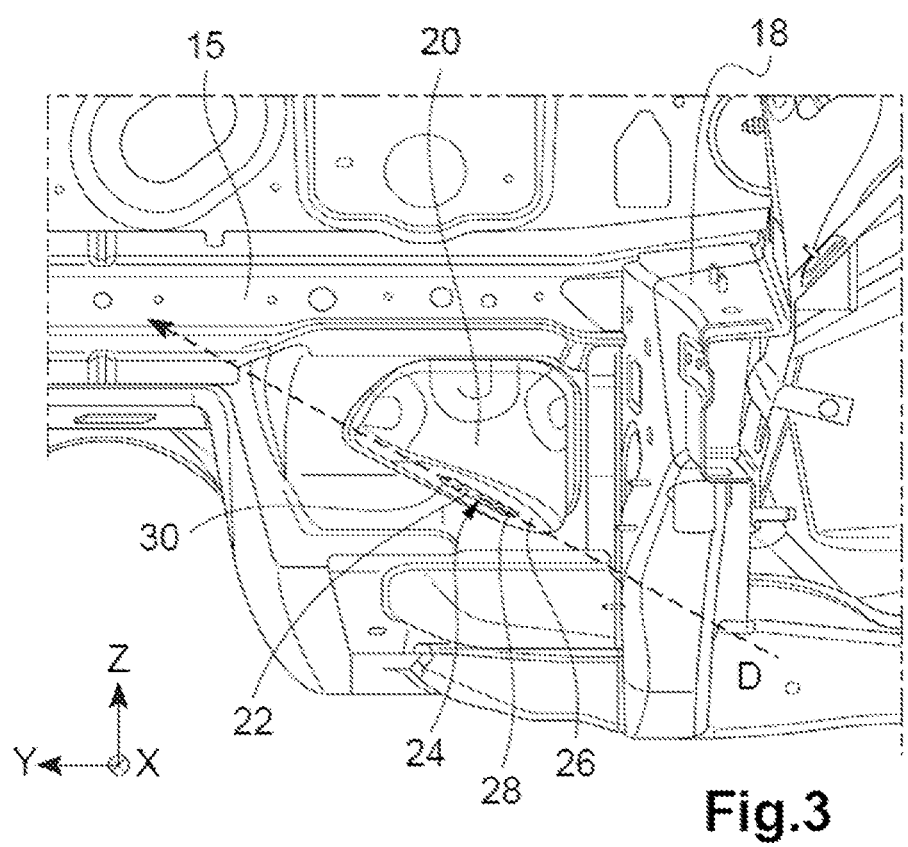
FIG. 3 shows a schematic perspective top view of the front structure portion illustrated in [FIG. 1] according to another viewing angle.
Figure 4:
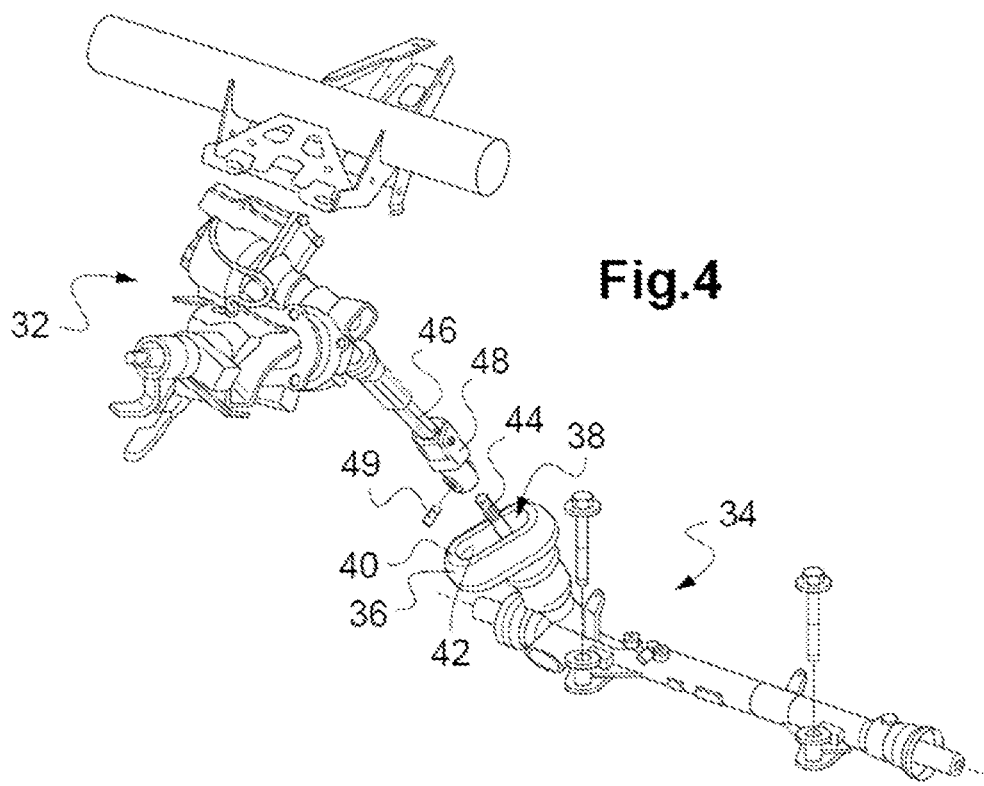
FIG. 4 shows a schematic, perspective view of elements which are intended to be installed in the portions illustrated in [FIG. 1] and [FIG. 2]

FIG. 3 to which reference will now be made shows the steering ball joint 20 from the engine compartment 14. The viewing angle is along the axis X in the region of the front left side member 18. Therefore, the oblong hole 24 and through it the base 22 can be seen at that location. This defines an edge 26 which extends around the oblong hole 24 in the engine compartment 14. Consequently, the edge 26 is of oblong annular form.

Furthermore, it can be seen in [FIG. 3] that the mean plane defined by the edge 26 is inclined relative to another mean plane defined by the left front side member 18 and the bulkhead cross-member 15 which it joins. This other mean plane is substantially horizontal and it is also defined by the two front side members. In other words, the mean plane is inclined toward the center of the engine compartment 14. It is, for example, inclined by an angle close to 45° relative to the axis Z. Consequently, the oblong hole 24 extends substantially in a direction D which belongs to a bisector plane, which is defined by the front left side member 18 and the bulkhead cross-member 15 extending along the axis Z. In this manner, the oblong hole 24 extends along a component in the bisector plane mentioned above and by an angle close to 45° relative to the axis Z, for example. Consequently, the oblong hole 24 has a lower end 28 which is located close to the front left side member 18 and an opposing upper end 30. Before describing the subject-matter of the invention in greater detail with reference to [FIG. 5], reference will first be made to [FIG. 4] which shows a steering column 32 which is capable of being installed on the bulkhead 12 in the passenger compartment 16 and a rack 34 which is suitable for being installed in the engine compartment 14. The rack 34 comprises an oblong casing 36 for torque conversion. The oblong casing 36 is capable of converting the torque applied by the steering column.

The oblong casing 36 has an oblong opening 38 which defines an oblong edge 40 to which a compressible oblong sealing joint 42 is applied. This sealing joint 42 is annular. Therefore, the rack 34 has a rack shaft 44 which extends through the oblong opening 38 and which protrudes in an eccentric position of the oblong opening 38. As will be explained below, the rack shaft 44 is adapted to be engaged through the oblong hole 24 of the steering ball joint 20 whilst the oblong edge 40 provided with the compressible oblong sealing joint 42 is applied against the steering ball joint 20. At the side of the passenger compartment 16, the steering column 32 has a final segment 46 which is provided with a final cardan joint 48. This final cardan joint 48 is adapted to be connected to the rack shaft 44 inside the steering ball joint 20 by means of a coupling screw 49, as will be explained below.

Reference will now be made to [FIG. 5], which shows a structural environment which is more restrictive than the one shown in [FIG. 1], [FIG. 2], [FIG. 3] and [FIG. 4], and which justifies the use of the invention. Therefore, the elements present in [FIG. 5] and equivalent to those of the preceding figures will have the same reference numerals assigned with a prime symbol: "'".

Figure 5:
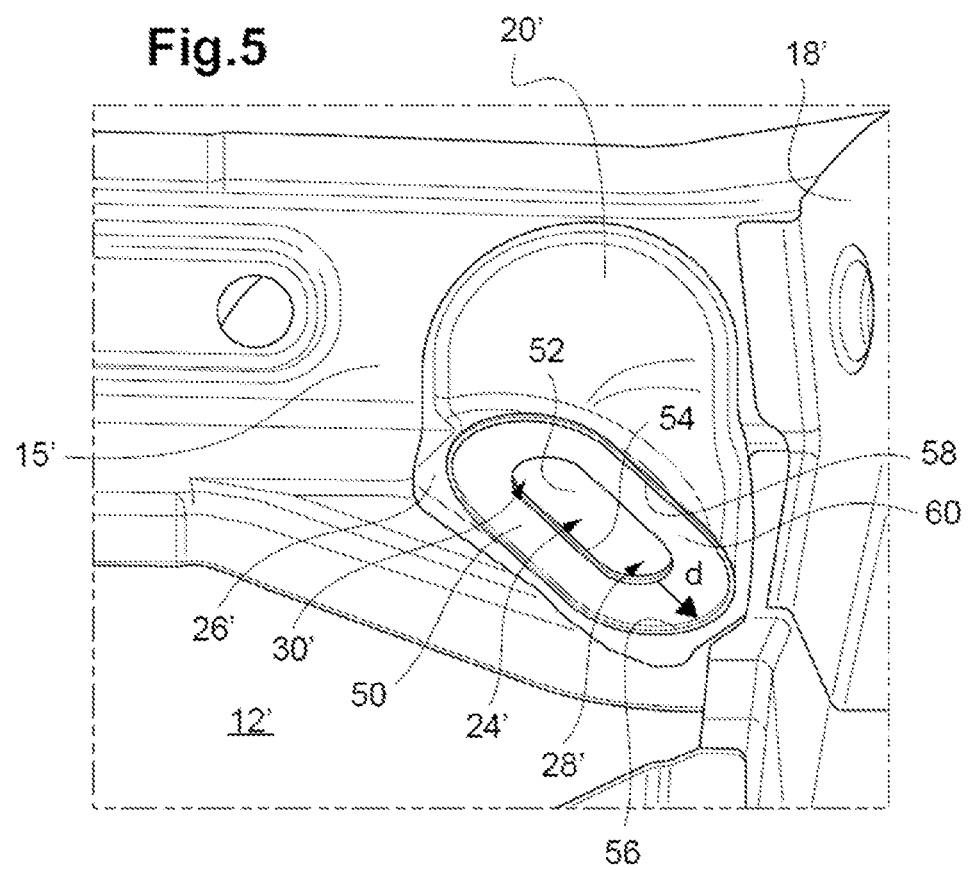
FIG. 5 shows a schematic, detailed view of [FIG. 3] showing the elements of the invention.

Therefore, it is possible to see in this [FIG. 5], in greater detail and when viewed from the engine compartment, the bulkhead 12', the steering ball joint 20' located at the connection of the bulkhead cross-member 15' and the front left side member 18'. In this manner, the steering ball joint 20' is substantially more compact than that illustrated in the preceding figures so that the front left side member 18' has been able to be configured in a position closer to the counterpart thereof, the front right side member. In other words, if the relative position of the steering ball joint 20' and the steering column is retained, the front left side member 18' is moved closer to the steering ball joint 20' which has had to be configured in a more compact manner, in the transverse direction of the axis Y.

This is because the movement closer together of the front side members is made necessary by the use of front wheel structural casings of a larger size. It is also possible to see in this [FIG. 5] the oblong hole 24' which extends from the upper end to the lower end 28' and the annular edge 26' thereof which is covered by an annular planar component 50. This annular planar component 50 is also oblong and it is installed with application on the annular edge 26'.

Therefore, the annular planar component 50 has by definition an oblong central aperture 52 which is defined by an inner edge 54 and the dimensions of which are identical to those of the oblong hole 24' of the steering ball joint 20'. In other words, the inner edge 54 delimits a cross section or surface which is identical to that delimited by the oblong hole 24'.

Furthermore, the annular planar component 50 has an outer edge 56 which is spaced apart from the inner edge 54 by a substantially constant distance d. The distance d is preferably between 15 mm and 25 mm. It is, for example, equal to 20 mm.

Furthermore, the annular planar component 50 has a peripheral edge 58 which continuously follows the outer edge 56.

In this manner, the annular planar component 50 defines an annular receiving bearing which is oblong and planar and which is more extensive than the annular edge 26' of the steering ball joint 20' is. Therefore, the annular planar component 50 extends beyond the annular edge 26' and the steering ball joint 20' in order to be able to provide the annular receiving bearing 60 of a size greater than that of the annular edge 26'. Furthermore, it is necessary for the annular planar component 50 to be connected to the steering ball joint 20' in a fluid-tight manner. Therefore, an annular mastic joint which is not illustrated is first formed around the oblong hole 24' on the annular edge 26' and close to the edge of the oblong hole 24'. Then, the annular planar component is pressed flat against the annular edge 26' so that the oblong hole 24' coincides completely with the oblong central aperture 52 of the annular planar component 50 with the mastic joint being flattened. Then, the annular planar component 50 is connected to the annular edge 26' with weld points being formed by means of a set of welding tongs, around the flattened annular mastic joint. In this manner, the sealing is ensured as a result of the mastic, and the annular planar component 50 is fixedly joined to the steering ball joint 20' as a result of the weld points. Advantageously, between 6 and 10 weld points are produced around the annular mastic joint. For example, eight weld points are produced.

In this manner, as a result of the annular receiving bearing 60 which is oblong and planar, the sealed assembly of the oblong casing 36 of the rack 34 is greatly facilitated, as will be explained below with reference to [FIG. 6] and [FIG. 7] and with the support of [FIG. 4] and [FIG. 5].

Figure 6:
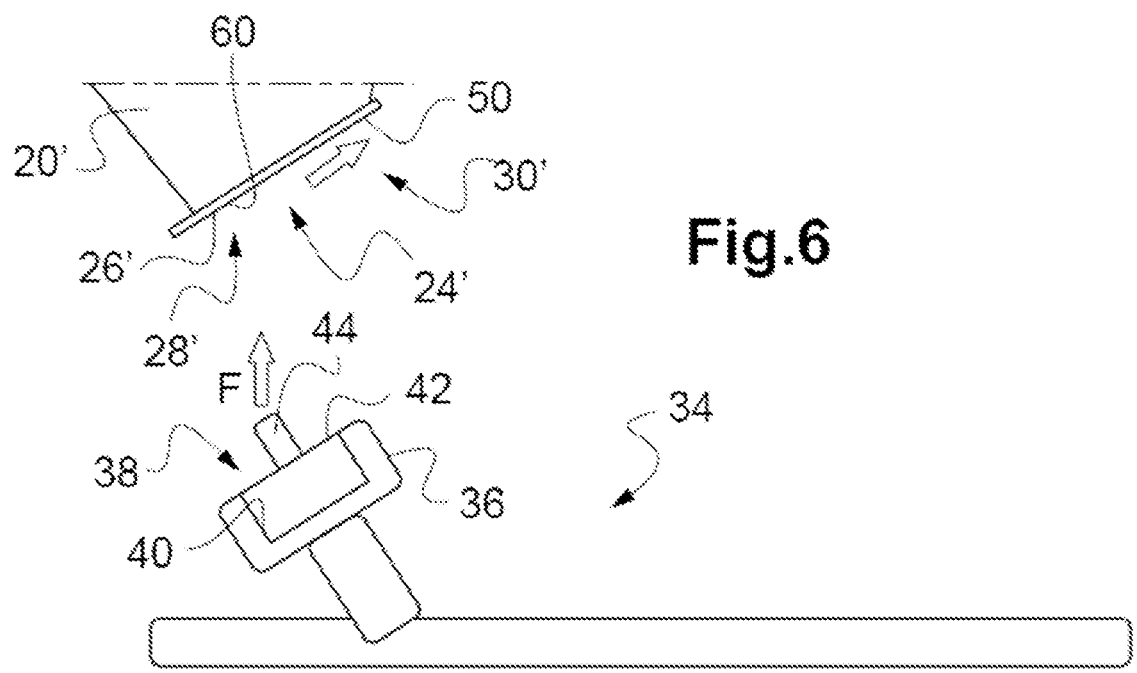
FIG. 6 shows a partial, schematic side view showing the assembly method of the object of [FIG. 4] on the elements of the object of [FIG. 5]
Figure 7:
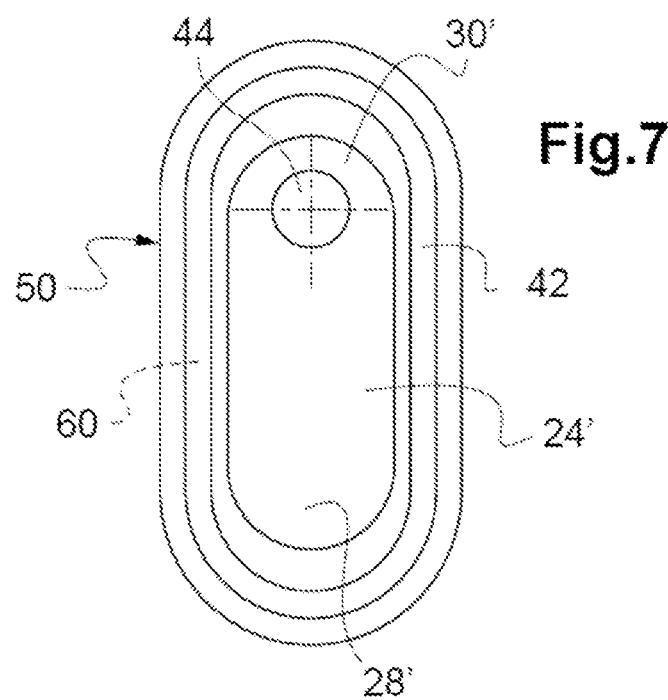
FIG. 7 shows a schematic sectioned view of the object of [FIG. 4] and the mounted elements of the object of [FIG. 5].

In this manner, it is possible to see in [FIG. 6] schematically the rack 34 and the oblong casing 36 thereof with the compressible oblong sealing joint 42 above. It is also possible to see the rack shaft 44 which protrudes from the oblong opening 38 of the oblong casing 36.

Furthermore, it is possible to partially see in [FIG. 6] the steering ball joint 20' which is provided with the annular planar component 50 applied against the annular edge 26' of the steering ball joint 20'.

In a first phase, the oblong casing 36 is thus adjusted in an inclined manner with respect to the oblong hole 24', and more specifically the rack shaft 44 in alignment with the lower end 28' thereof.

Then, in a second movement phase, the oblong casing 36 is moved in translation along the vertical axis Z against the annular planar component 50 so that the rack shaft 44 penetrates through the lower end 28' of the oblong hole 24' whilst the compressible oblong sealing joint 42 comes into planar contact with the annular receiving bearing 60 of the annular planar component 50.

Then, in a third movement phase, the compressible oblong sealing joint 42 is compressed between the oblong edge 40 of the oblong casing 36 and the annular receiving bearing 60, whilst the oblong edge 40 is driven with a sliding movement against the annular receiving bearing 60. In this manner, the rack shaft 44 is driven in translation toward the upper end 30' of the oblong hole 24' while moving away from the front left side member 18', whilst the compressible oblong sealing joint 42 which is compressed is adjusted around the oblong hole 24'.

In other words, the annular receiving bearing 60 is sufficiently wide to be able to receive with friction the compressible oblong sealing joint 42 until it is completely adjusted around the oblong hole 24'.

In this manner, as illustrated as a view from below in section in [FIG. 7], between the oblong edge 40 and the oblong sealing joint 42 thereof, and which drawing shows the rack shaft 44 which extends in the upper end 30' of the oblong hole 24', the compressible oblong sealing joint 42 is completely compressed between the oblong edge 40 of the oblong casing 36 and the annular receiving bearing 60, and it thus ensures excellent sealing between the oblong casing 36 of the rack 34 and the steering ball joint 20'.

Therefore, the oblong casing 36 is fixed in this position where it is compressed against the annular planar component 50, whilst, on the other hand, the final cardan joint 48 is connected to the rack shaft 44 using the coupling screw 49. In this manner, the connection between the final cardan joint 48 and the rack shaft 44 enables the oblong casing 36 to be held in abutment with force against the annular planar component 50, whilst the compressible oblong sealing joint 42 is compressed. In this manner, the sealing is completely ensured between the oblong casing 36 and the steering ball joint 20'.

The invention claimed is:
1. A front structure of a motor vehicle which has a passenger compartment and an engine compartment which extends in continuation of the passenger compartment, the front structure comprising:

a bulkhead which extends transversely between the engine compartment and the passenger compartment and which is configured to support a steering column;

two substantially parallel front side members which are connected to the bulkhead and which extend longitudinally in the engine compartment;

a steering ball joint which is arranged in the bulkhead substantially in line with the steering column and which protrudes into the engine compartment between the two side members close to a connection between the bulkhead and one of the side members, the steering ball joint having a base and an oblong hole which is provided in the base and which defines an edge which extends around the oblong hole opposite the engine compartment;

a rack which is installed in the engine compartment and a rack joint which is configured to engage between the rack and the steering ball joint when the steering column is connected to the rack via the oblong hole; and an annular planar component which is installed in a state applied to the edge and which extends around the oblong hole to widen a receiving bearing of the rack joint.

2. The structure as claimed in claim 1, wherein the two side members define a mean plane and the annular planar component is inclined relative to the mean plane.

3. The structure as claimed in claim 1, wherein one of the side members and the bulkhead define a bisector plane and the oblong hole extends along a component contained in the bisector plane.

4. The structure as claimed in claim 1, wherein the oblong hole has a lower end which is located toward one of the side members and an upper end which is opposite the lower end and which is spaced apart from one of the side members.

5. The structure as claimed in claim 1, wherein the annular planar component is connected to the edge by weld points.

6. The structure as claimed in claim 1, further comprising an annular mastic joint between the annular planar component and the edge.

7. The structure as claimed in claim 1, wherein the annular planar component has an inner edge and an opposing outer edge, and a minimum distance between the two opposing edges is between 15 mm and 25 mm.

8. The structure as claimed in claim 7, wherein the inner edge delimits a cross section which is identical to a cross section of the oblong hole.

9. The structure as claimed in claim 1, wherein the annular planar component has a peripheral edge.

\* \* \* \* \*